United States Patent [19]
Tsyrganovich

[11] Patent Number: 6,163,346
[45] Date of Patent: Dec. 19, 2000

[54] DOT CRAWL REDUCTION IN NTSC/PAL GRAPHIC ENCODER

[75] Inventor: Anatoliy V. Tsyrganovich, San Jose, Calif.

[73] Assignee: Zilog, Incorporated, Campbell, Calif.

[21] Appl. No.: 08/940,122

[22] Filed: Sep. 29, 1997

[51] Int. Cl.⁷ .............................. H04N 5/21; H04N 9/64
[52] U.S. Cl. ..................... 348/607; 348/612; 348/649; 348/645
[58] Field of Search ..................... 348/607, 603, 348/608, 609, 612, 624, 645, 646, 649, 651, 654, 253, 256, 631; 358/520; H04N 5/21, 9/64, 9/68

[56] References Cited

U.S. PATENT DOCUMENTS

| | | |
|---|---|---|
| 3,688,021 | 8/1972 | Ekstrand . |
| 4,679,072 | 7/1987 | Takayama . |
| 4,714,954 | 12/1987 | Yoshinaka et al. . |
| 4,788,586 | 11/1988 | Eckenbrecht . |
| 4,939,572 | 7/1990 | Kosaka et al. . |
| 5,355,225 | 10/1994 | Bachmann ............................. 348/645 |
| 5,867,169 | 2/1999 | Prater ..................................... 358/520 |

OTHER PUBLICATIONS

"Video Demystified," Second Edition; Keith Jack; HighText Publications, San Diego, California; 19_.

*Primary Examiner*—Sherrie Hsia
*Attorney, Agent, or Firm*—Majestic, Parsons, Siebert & Hsue, P.C.

[57] ABSTRACT

By reducing the saturation (amplitude) at changes in the hue (phase) of the chrominance subcarrier of a video signal, the phenomenon of "dot crawl" can be substantially reduced for graphic data. It has been found that large hue (phase) changes associated with graphic data can cause large frequency shifts of the chrominance subcarrier resulting in a substantial portion of the chrominance subcarrier being unsuppressed by the chrominance subcarrier rejection filter of the luminance decoder. By reducing the saturation during the hue transition, the intensity of the spurious luminance information of the non-suppressed chrominance subcarrier is reduced.

23 Claims, 5 Drawing Sheets

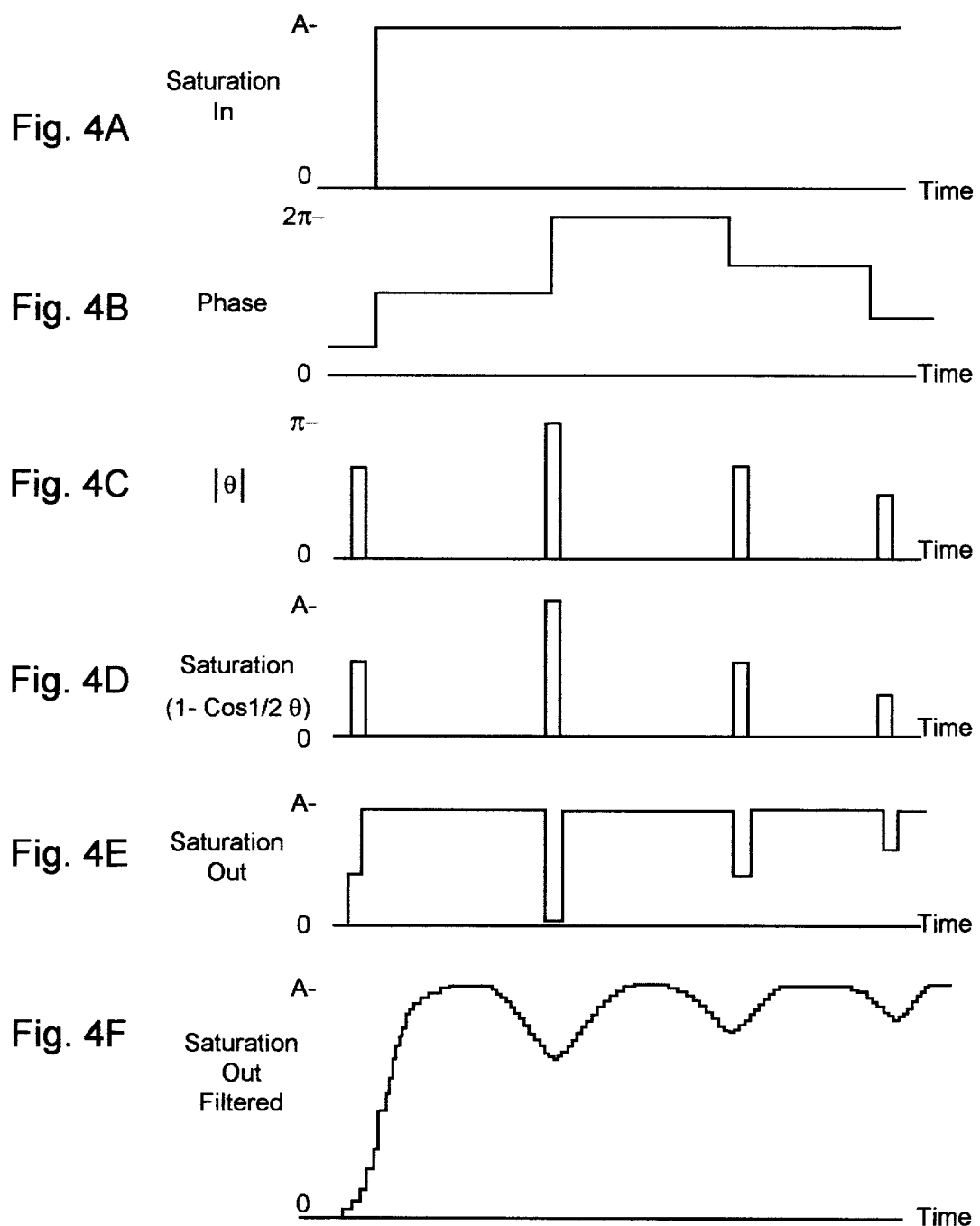

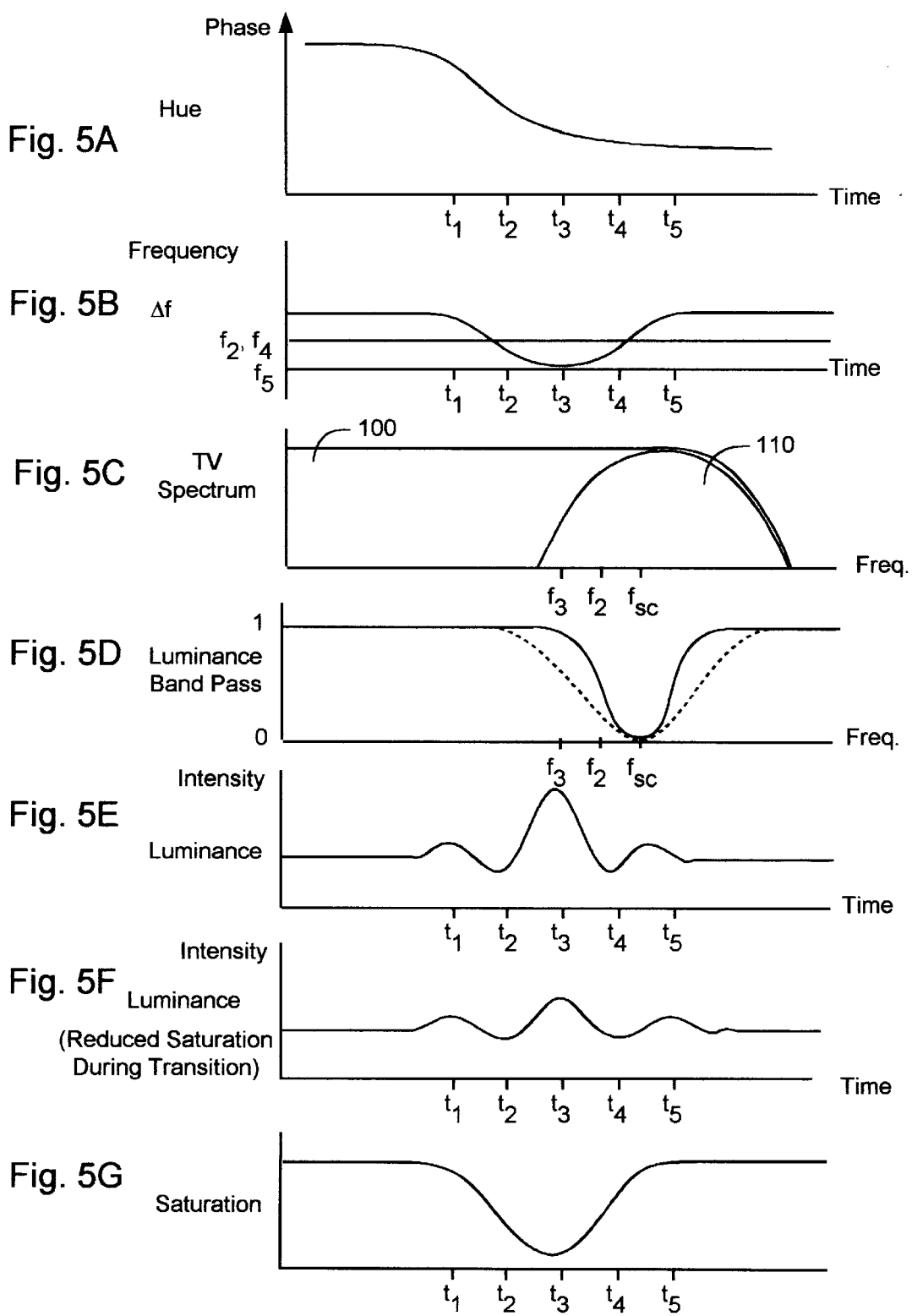

DOT CRAWL REDUCTION IN NTSC/PAL GRAPHIC ENCODER

BACKGROUND OF THE INVENTION

The present invention relates to video encoding. The book "Video Demystified," Second Edition, by Keith Jack, incorporated herein by reference, describes the background for digital video encoding and decoding. A problem that has been noticed when graphics are encoded on a video signal is "dot crawl." At the edges of graphic elements, high and low intensity dots are sometimes produced which migrate along the edge of the graphic elements. Such "dot crawl" reduces the television picture quality.

It is desired to have an improved means of reducing the "dot crawl" effect on a video signal.

SUMMARY OF THE PRESENT INVENTION

The most common television standards are the National Television Standards Committee (NTSC) standard used in the United States and the Phase Alternation Line (PAL) standard used in many European countries. Both of these standards derive from earlier standards in which all of the picture data is used to encode the black and white picture or luminance.

In current video standards, the color information is encoded onto a chrominance subcarrier about a subcarrier frequency within the picture data bandwidth. The chrominance subcarrier has a phase which encodes hue information and an amplitude which encodes saturation information. The hue of a pixel is a basic color such as red or green. The saturation of a pixel indicates the level of the color. For example, a hue at a low saturation may be pink and the same hue with a high saturation may be dark red.

In order to recover the luminance information, video decoders use a chrominance rejection filter centered about a subcarrier frequency to remove most of the chrominance subcarrier. If there is a substantial level of unsuppressed chrominance subcarrier on the reconstructed luminance signal, spurious luminance intensity information is displayed on the screen.

Television pictures are generally smooth, making small hue changes between pixels. Graphic information from graphic encoders, however, can have sharp edges and large phase (hue) changes between adjacent pixels. The frequency deviation of the chrominance subcarrier from the subcarrier frequency is proportional phase (hue) difference between pixels. With large hue changes, the frequency-deviated chrominance subcarrier is not adequately suppressed by the chrominance rejection filter and spurious luminance information is displayed. This produces the unwanted dot crawl.

In the present invention, the saturation value is reduced when the hue value changes. This reduces the level of unsuppressed chrominance subcarrier on the luminance signal, since the amplitude of the chrominance subcarrier is related to the saturation.

In a preferred embodiment, the saturation is reduced as a function of the hue change. In one embodiment, the hue change between pixels is a phase value $\theta$, and the reduction of saturation is proportional to $(1-\cos \frac{1}{2}\theta)$. The modified saturation value is preferably low-pass filtered before being encoded into the video signal.

BRIEF DESCRIPTION OF THE DRAWINGS

The above and other features and aspects of the present invention will become more apparent upon reading the following detailed description in conjunction with the accompanying drawings, in which:

FIG. 4A is a graph illustrating a typical input saturation for the circuitry of FIG. 2;

FIG. 4B is a graph illustrating a typical input phase for the circuitry of FIG. 2;

FIG. 4C is a graph of the absolute value of the change in the hue, $|\theta|$, for the circuitry of FIG. 2;

FIG. 4D is a graph of the equation $(1-\cos \frac{1}{2}\theta)$ for the circuitry of FIG. 2;

FIG. 4E is a graph of the saturation output of the saturation modifying circuitry of FIG. 2;

FIG. 4F is a filtered output of the saturation modifying circuitry of FIG. 2;

FIG. 5A is a graph of a filtered hue change;

FIG. 5B is a graph of the change in the frequency of the chrominance subcarrier as a result of the change in the hue;

FIG. 5C is a graph of the television spectrum;

FIG. 5D is a graph of the luminance bandpass illustrating the chrominance rejection filter;

FIG. 5E is a graph of the luminance signal produced with an unmodified saturation;

FIG. 5F is a graph of the luminance signal produced with a modified saturation in which the saturation is reduced during the phase transition; and FIG. 5G is a graph of a filtered modified saturation in which the saturation is reduced during the phase transition.

DETAILED DESCRIPTION OF THE PREFERRED EMBODIMENT

Figure 1:
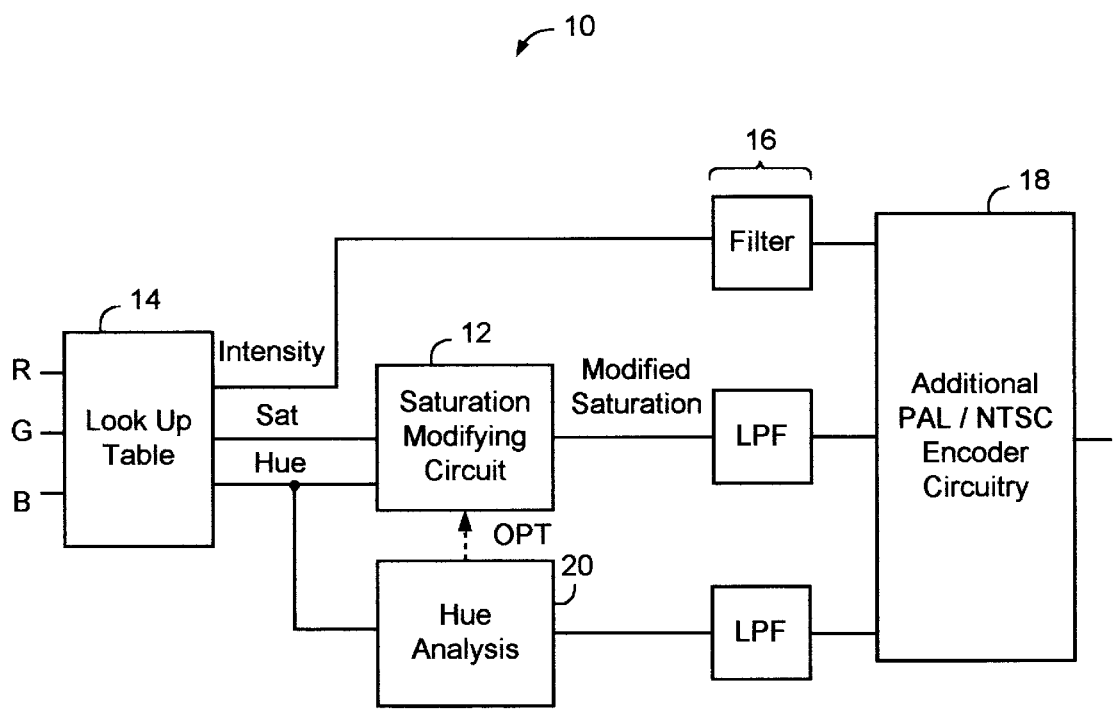
FIG. 1 is a diagram of a video encoder which uses the saturation modifying circuitry of the present invention.

FIG. 1 is a diagram of the encoder 10 using the saturation modifying circuitry 12 of the present invention. A lookup table 14 is used to translate Red-Green-Blue (RGB) digital data into Hue-Saturation-Intensity data. Such data is eventually sent through the low-pass filters 16 to the additional PAL/NTSC encoder circuitry 18. The additional PAL/NTSC encoder circuitry forms a chrominance subcarrier from the hue and the saturation, combines this chrominance subcarrier with the luminance, and adds the vertical/horizontal blanking, sync and audio information to produce the output of the video encoder. The saturation modifying circuitry 12 in the present invention is used to reduce the saturation upon hue changes. The saturation modifying circuitry 12 receives the saturation and hue data as inputs. Optionally, hue analysis can be done in circuitry 20 and a modified hue sent to the saturation modifying circuitry 12.

Figure 2:
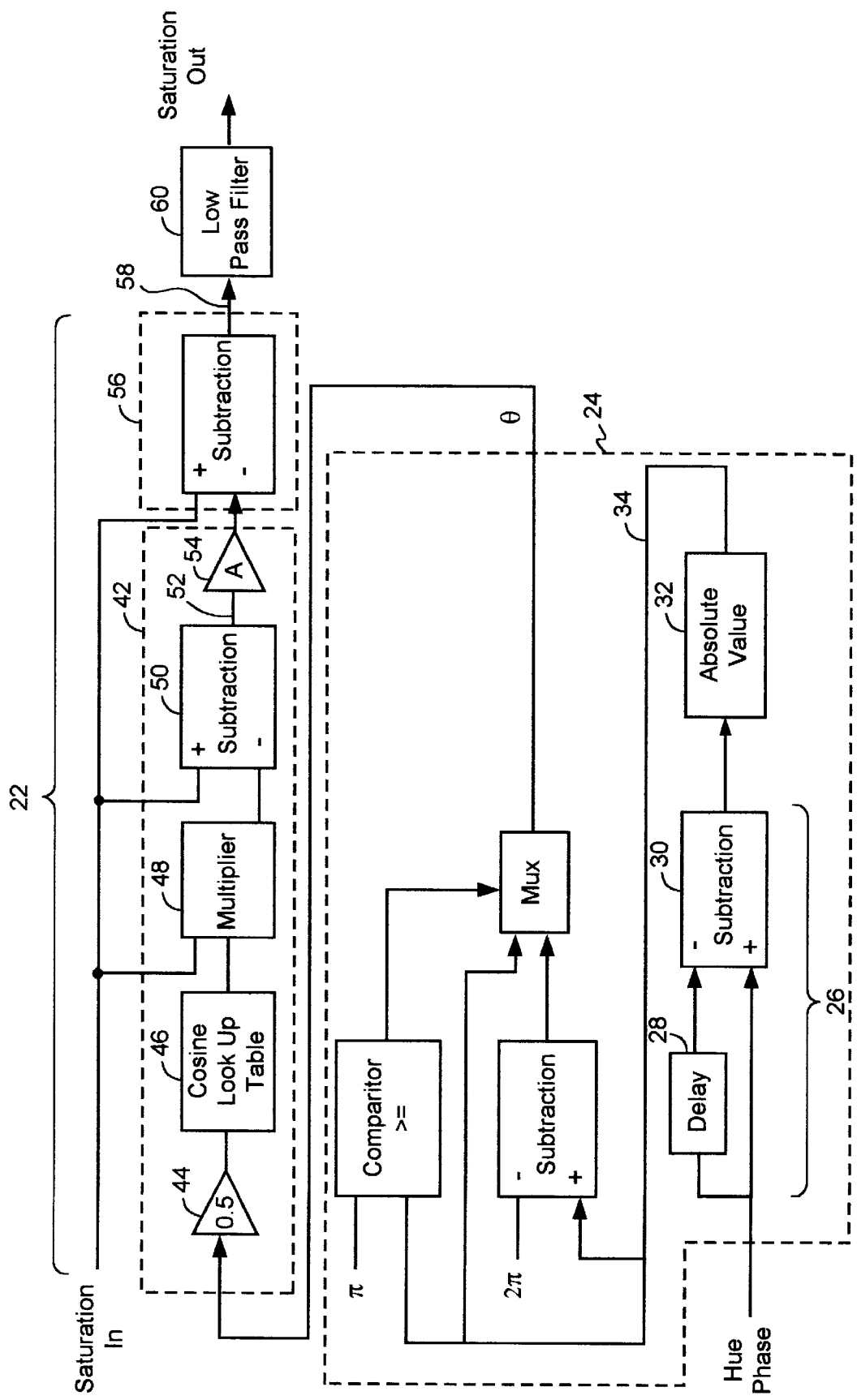
FIG. 2 is a diagram of an embodiment of the saturation modifying circuitry of the present invention.

FIG. 2 is a diagram illustrating an embodiment of the saturation modifying circuitry 22 of the present invention. This circuitry 22 includes circuitry 24 which is used to produce an indication, $\theta$, of the hue change. Circuitry 26 compares the current hue value with the last hue value. This circuitry 26 includes a delay 28, such as a flip-flop, and a subtracting unit 30. Absolute value circuitry 32 produces the absolute value of the output of circuitry 26. If the absolute value on line 34 is greater than $\pi$, the output of the circuitry 24 is the absolute value minus $2\pi$; otherwise, the output of the circuitry 24 is the absolute value.

Circuitry 42 takes the $\theta$ value and the input saturation and produces a modifying signal for the saturation. Amplifier 44 converts to the θ value to a ½θ value. Amplifier 44 can be implemented as a shift register. Cosine lookup table 46 produces the a cos ½θ value, which is multiplied by the saturation by multiplier 48. Subtracting unit 50 produces a (saturation)(1−cos ½θ) value on line 52. Amplifier 54 produces a value equal to A(saturation)(1−cos ½θ), where A is a constant from 0 to 1.

This A(saturation)(1−cos ½θ) value on line 52 is subtracted from the saturation in circuitry 56 to produced the modified saturation value (1−A(1−cos ½θ))(saturation) on line 58. The modified saturation value varies linearly with respect to the A constant from (saturation) when A=0 to (cos ½θ)(saturation) when A=1. By changing the value of "A," the rejection pulse can be adjusted to get a desirable amplitude (saturation) rejection for the designated low-pass filter response.

The low-pass filter 60 filters the modified saturation value before it is sent to the additional encoding circuitry. The modified saturation value is filtered to reduce the signal bandwidth so that the chrominance information is within the desired area of the television spectrum.

Figure 3:
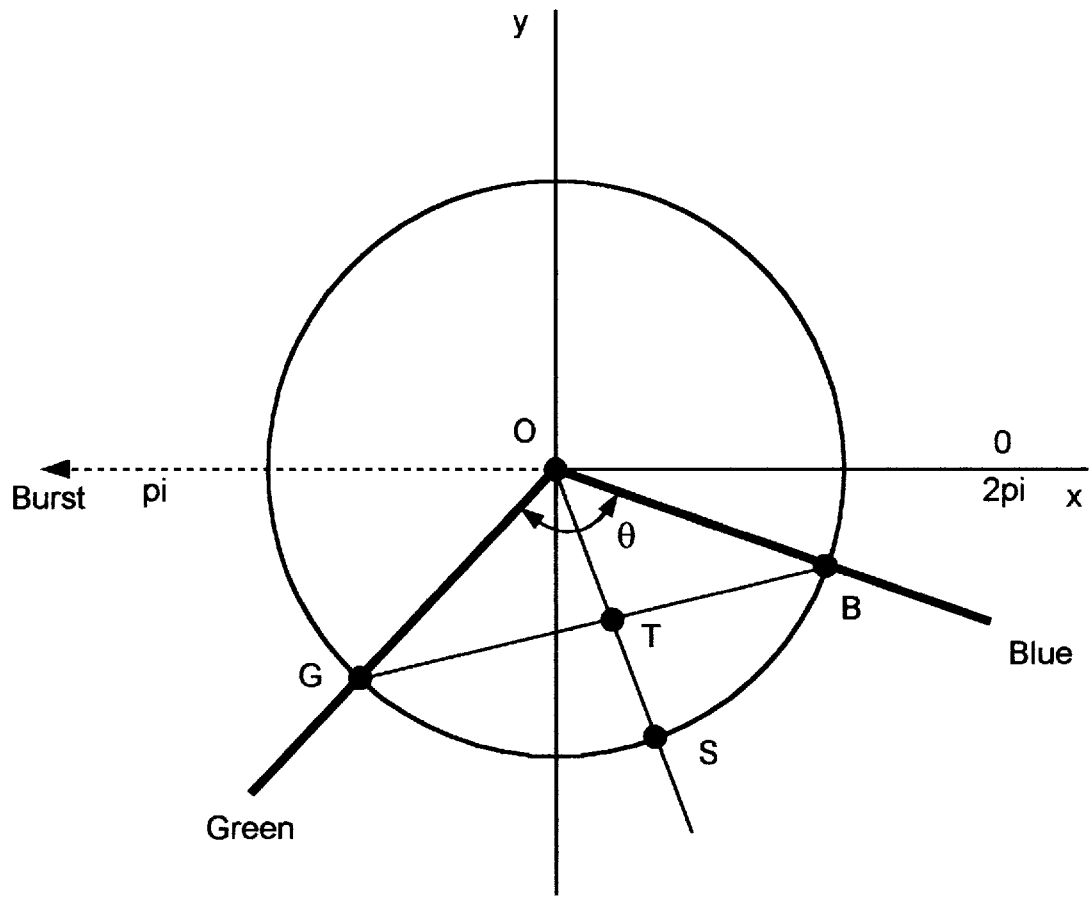
FIG. 3 is a graph of a polar representation of a phase change between pixels.

FIG. 3 is a graph illustrating a polar representation of the hue and saturation values. For each pixel the angle is the hue and the radius is the saturation. Consider a transition from a green pixel G to a blue pixel B. In the prior system, the saturation would remain the same and in the hue transition the chrominance would sweep through point S. If the change from point G to point B was done using a straight line, the chrominance would move through a point T. Since the distance OT is (cos ½θ)(saturation), this value is an intuitive selection for the modified saturation during the green-blue transition. It has been found that such a strong reduction in saturation is not required, and for that reason, the saturation is reduced only a portion of the distance between T and S, as shown in FIG. 3.

FIG. 4A is a graph of an example of a saturation input to the circuitry of FIG. 2. FIG. 4B is a graph of an example of a phase input to the circuitry of FIG. 2. FIG. 4C is a graph illustrating the absolute value of a hue phase change, |θ|, on line 40. FIG. 4D illustrates the value of (saturation)(1−cos ½θ) at line 52 of the circuitry of 22. FIG. 4E illustrates the modified saturation output at the line 58 of the circuitry of FIG. 2 assuming that A=1. FIG. 4F illustrates the filtered saturation output at line 61 of the circuitry of FIG. 2. Note that there is a reduction in the modified saturation when the phase changes, and that this reduction is a function of the phase change.

FIG. 5A is a graph illustrating the filtered hue transition. The hue has a first value at time $T_1$ and transitions to a second value at time $T_5$. FIG. 5B is a graph illustrating the frequency deviation of the chrominance subcarrier caused by the hue change. Note that the frequency deviation is highest at time $T_3$ in the middle of the hue phase change. FIG. 5C is a graph of a television spectrum versus frequency illustrating the frequency area typically containing the chrominance information 110 and the frequency area typically containing the luminance information 100. The frequency deviation $f_3$ at time $T_3$ is at an edge of the chrominance information. FIG. 5D is an illustration of a luminance band path filter. Note that, at frequency $f_3$, corresponding to the hue change at time $T_3$, the chrominance information is not suppressed by the filter and thus passes on to the video screen as unwanted luminance information which can produce the "dot crawl" phenomenon. A broader chrominance rejection filter, shown in phantom, would suppress the chrominance information, but the resulting luminance signal would be excessively blurry.

FIG. 5E illustrates the luminance information during the time $T_1$–$T_5$. Note that the unwanted chrominance information produces a spurious intensity spike which results in "dot crawl." FIG. 5F illustrates another luminance signal in which the saturation layer is reduced during the hue transition. Note that the size of the spurious intensity spike is substantially reduced. FIG. 5G is a graph illustrating a reduction in the saturation during the hue phase transition period $T_1$–$T_5$.

using the method and apparatus of the present invention, the "dot crawl" effect is reduced as a result of lowering the level of non-suppressed chrominance information on the luminance signal during the hue phase transition period.

Various details of the implementation and method are merely illustrative of the invention. It will be understood that various changes of such details may be within the scope of the invention, which is to be limited only by the appended claims. For example, the the saturation may be reduced only if the hue change is greater than a minimum value. Additionally, the reduction of the saturation can be by another algorithm than reduction=(1−cos ½θ) (saturation) used in a preferred embodiment.

Additional related disclosure to this application is contained in the co-pending applications, "Circle Correction in Digital Low-Pass Filter," application Ser. No. 08/937,877, filed Sep. 29, 1997 and "Reduction of Color Transition Distortions in NTSC/PAL Encoder", application Ser. No. 08/939,156 filed Sep. 29, 1997 by inventor Anatoliy Tsyrganovich, which are incorporated herein by reference.

What is claimed is:

1. A method comprising:
    providing picture data having multiple variables;
    modifying the picture data by reducing a first saturation variable on a change of a second hue variable θ; and
    producing a video signal from the modified picture data, wherein the reduction of said saturation variable is proportional to 1−cos ½θ.

2. The method of claim 1, wherein the saturation variable is filtered to produce filtered saturation data, and the filtered saturation data is used to produce the video signal.

3. A video signal encoder comprising:
    a color space converter converting data into picture data having multiple variables;
    circuitry attached to the color space converter adapted to modify the picture data by reducing a first variable on a change of a second variable; and
    circuitry adapted to produce a video signal from the modified picture data,
    wherein the color space converter is such that a change in said second variable between pixels is encoded as a virtual angle, θ, and wherein the modifying circuitry is such that the reduction of said first variable depends on θ;
    and wherein the modifying circuitry is such that the reduction of said first variable is proportional to 1−cos ½θ.

4. The video signal encoder of claim 3, wherein the modifying circuitry is such that the saturation variable is filtered to produce a filtered saturation variable which is sent to the video signal producing circuitry.

5. A device comprising:
    circuitry adapted to modify picture data by reducing saturation on a change of hue; and
    circuitry adapted to produce a video signal from the modified picture data,
    wherein the modifying circuitry is such that said change in the hue between pixels is encoded as a virtual angle, θ, and wherein the modifying circuitry is such that the reduction of the saturation depends on θ; and wherein said modifying circuitry is such that the reduction of the saturation is proportional to 1−cos ½θ.

6. A method for adjusting image data prior to encoding in order to improve display of a subsequently decoded image comprising the steps of:

receiving the image data having at least a first and a second independent variable per image unit;

analyzing said first independent variable to determine changes in said first independent variable; and based on said analyzing, adjusting said second independent variable, said adjusting having the effect of reducing unwanted artifacts when an encoded image is decoded.

7. The method of claim 6, further comprising:

low pass filtering said first independent variable and said adjusted second independent variable.

8. The method of claim 6, further comprising:

encoding said first independent variable and said adjusted second independent variable into a video signal suitable for transmission.

9. The method of claim 6, wherein said first variable indicates hue.

10. The method of claim 6, wherein said second variable indicates saturation.

11. The method of claim 6, further comprising:

receiving image data having a third independent variable, said third independent variable indicating intensity.

12. The method of claim 11 wherein said received image data is converted from an RGB representation.

13. The method of claim 11 where in initial image data is generated by a digital graphics processor.

14. The method of claim 6 further wherein said second variable's magnitude is reduced depending on the magnitude of the change in said first variable.

15. The method of claim 6, wherein said first variable indicates hue, said second variable indicates saturation, and wherein a change in hue between pixels is encoded as the virtual angle, θ, and wherein a reduction of a saturation depends on θ.

16. The method of claim 6 where in at least some of the variables are encoded as a difference from a prior pixel.

17. The method of claim 6 wherein said analyzing step further comprises:

determining a difference in values between a current first independent variable and a previous first independent variable value;

comparing said difference to a reference value;

based on the results of said comparing, selecting said difference or said difference combined with a second reference value as a first result; and using said first result to adjust said second variable.

18. The method of claim 17 further comprising:

determining a trigonometric function value from said first result;

multiplying said trigonometric function value with said independent second variable to obtain a third result;

subtracting said third result from said independent second variable to obtain a fourth result;

from said fourth result determining a fifth result;

subtracting said fifth result from said independent second variable to obtain a sixth result, said sixth result providing an output of said second variable.

19. The method of claim 18 further comprising:

multiplying said first result by a first coefficient to obtain a second result; and multiplying said fourth result by a second coefficient to obtain said fifth result.

20. The method of claim 19 further comprising:

low pass filtering said sixth result to provide said output.

21. The method of claim 14 further comprising:

wherein said first independent variable is encoded as a phase angle;

wherein said value difference between a current first variable and a previous first variable is expressed as an absolute value;

wherein said comparing determines if said value difference is less than π;

wherein said second reference value is 2π;

wherein said first coefficient is about ½; and wherein said second coefficient is less than or equal to 1.

22. The method of claim 18 further comprising:

multiplying said fourth result by a second coefficient to obtain said fifth result;

wherein said second coefficient is adjustable;

wherein said adjusted second independent variable varies linearly with respect said second coefficient; and wherein by changing the value of said second coefficient, a rejection pulse can be adjusted to get a desired amplitude rejection.

23. A method for encoding video signals into a format suitable for transmission comprising:

determining the hue value of an initial pixel;

determining a transition path to a subsequent pixel which would normally move through an interim saturation value; and determining changes in said hue value from said initial pixel to the subsequent pixel;

adjusting said interim saturation value down to a lower saturation value, based on changes in said hue value.

* * * * *